(12) United States Patent
Hai

(10) Patent No.: US 11,256,897 B2
(45) Date of Patent: Feb. 22, 2022

(54) FINGERPRINT IDENTIFICATION DEVICE AND MANUFACTURING METHOD THEREOF, AND LIGHT GUIDE COMPONENT

(71) Applicant: BOE TECHNOLOGY GROUP CO., LTD., Beijing (CN)

(72) Inventor: Xiaoquan Hai, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/992,238

(22) Filed: Aug. 13, 2020

(65) Prior Publication Data

US 2021/0124890 A1    Apr. 29, 2021

(30) Foreign Application Priority Data

Oct. 25, 2019    (CN) .......................... 201911025174.2

(51) Int. Cl.
  *G06K 9/00* (2006.01)
  *G02B 1/14* (2015.01)
  *G02B 1/04* (2006.01)

(52) U.S. Cl.
  CPC ............. *G06K 9/001* (2013.01); *G02B 1/045* (2013.01); *G02B 1/14* (2015.01); *G06K 9/0004* (2013.01)

(58) Field of Classification Search
  CPC .. G06K 9/001; G06K 9/0004; G06K 9/00073; G06K 9/0008; G06K 2009/0006;
  (Continued)

(56) References Cited

U.S. PATENT DOCUMENTS

| 4,832,485 A | 5/1989 | Bowles |
| 10,838,221 B2 | 11/2020 | Hai et al. |

(Continued)

FOREIGN PATENT DOCUMENTS

| CN | 106886767 A | * | 6/2017 | ........... G06K 9/0004 |
| CN | 108227230 A | | 6/2018 | |

(Continued)

OTHER PUBLICATIONS

Office Action dated Dec. 23, 2021, issued in counterpart CN Application No. 201911025174.2, with English Translation. (20 pages).

*Primary Examiner* — Abhishek Sarma
(74) *Attorney, Agent, or Firm* — Westerman, Hattori, Daniels & Adrian, LLP

(57) ABSTRACT

A fingerprint identification device and a manufacturing method thereof, and a light guide component are provided, the fingerprint identification device includes: a display panel including a light-emitting surface and an opposite side opposite to each other, the light-emitting surface being configured to approach valley and ridge of a fingerprint to be identified; a light guide component disposed on the opposite side; and a light sensing component disposed on a side of the light guide component away from the display panel, the light guide component includes a light-shielding film layer made of a black light-shielding material, the light-shielding film layer is provided with a plurality of light-passing holes arranged in an array, and each of the light-passing holes has a light collecting angle of $\theta$, which is less than or equal to the maximum light collecting angle $\alpha$ at which the valley and ridge of the fingerprint can be distinguished.

19 Claims, 5 Drawing Sheets

(58) Field of Classification Search
CPC ...... G06K 9/00013; G02B 1/14; G02B 1/045; G02B 27/30; G02B 2207/123; G02B 5/003; G02B 1/04; H01L 31/02325; H01L 27/14623; H01L 27/14629; H01L 27/14685; H01L 27/3234; H01L 31/0236; H01L 51/56; G06F 3/0421; G06F 2203/04109; G06F 21/32
See application file for complete search history.

(56) References Cited

U.S. PATENT DOCUMENTS

| | | | |
|---|---|---|---|
| 2004/0252867 | A1 | 12/2004 | Lan et al. |
| 2008/0273771 | A1 | 11/2008 | Hsieh et al. |
| 2017/0161540 | A1* | 6/2017 | Mienko .............. G06K 9/00073 |
| 2019/0050621 | A1* | 2/2019 | Xu ....................... G06K 9/0004 |
| 2020/0026903 | A1 | 1/2020 | Hai et al. |
| 2020/0210671 | A1* | 7/2020 | Ling ...................... G02B 27/30 |
| 2020/0348550 | A1 | 11/2020 | Wu et al. |
| 2021/0174049 | A1 | 6/2021 | Hai et al. |
| 2021/0365704 | A1 | 11/2021 | Gu et al. |

FOREIGN PATENT DOCUMENTS

| | | | |
|---|---|---|---|
| CN | 108985235 | A | 12/2018 |
| CN | 109239938 | A | 1/2019 |
| CN | 110096928 | A | 8/2019 |
| CN | 110309705 | A | 10/2019 |

* cited by examiner light source incident angle

FINGERPRINT IDENTIFICATION DEVICE AND MANUFACTURING METHOD THEREOF, AND LIGHT GUIDE COMPONENT

CROSS-REFERENCE TO RELATED APPLICATION

This application claims priority of Chinese Patent Application No. 201911025174.2 filed on Oct. 25, 2019 in China National Intellectual Property Administration, the disclosure of which is incorporated herein by reference in entirety.

TECHNICAL FIELD

The present disclosure relates to the field of fingerprint identification technology, and in particular, to a fingerprint identification device and a manufacturing method thereof, and a light guide component.

BACKGROUND

At present, in the process of optical fingerprint identification, when the distance between the finger and the sensor is large, the obtained image will be blurred due to the scattering of the light reflected by the finger, which in turn leads to that the fingerprint information identified based on the light received by the sensor is not accurate.

How to improve the accuracy of identifying fingerprint information is a difficult problem to be solved in this field.

SUMMARY

Some embodiments of the present disclosure provide a fingerprint identification device, comprising:

a display panel comprising at least one light-emitting surface and an opposite side disposed opposite to the light-emitting surface, the light-emitting surface being configured to approach valley and ridge of a fingerprint to be identified;

a light guide component disposed on the opposite side of the display panel; and a light sensing component disposed on a side of the light guide component away from the display panel, wherein the valley and ridge of the fingerprint to be identified are configured to receive and reflect light emitted by the display panel, the light sensing component is configured to receive light reflected by the valley and ridge of the fingerprint to be identified, and a maximum light collecting angle at which the valley and ridge of the fingerprint to be identified can be distinguished by the light sensing component is $\alpha$;

the light guide component comprises a light-shielding film layer, the light-shielding film layer is made of a black light-shielding material, the light-shielding film layer is provided with a plurality of light-passing holes along a thickness direction of the light-shielding film layer, and the plurality of light-passing holes are arranged in an array, and each of the light-passing holes has a light collecting angle of $\theta$, and the light collecting angle $\theta$ is less than or equal to the maximum light collecting angle $\alpha$.

In some embodiments, the light guide component further comprises a protective layer disposed on a side of the light-shielding film layer close to the display panel, and the protective layer is made of a transparent material.

In some embodiments, the protective layer is made of polyimide or polymethyl methacrylate.

In some embodiments, the light collecting angle $\theta$ of at least one of the light-passing holes satisfies the following formula:

$$\operatorname{Tan}(\theta/2) = W/H;$$

wherein, H is a thickness of the light-shielding film layer, and W is an aperture of the at least one of the light-passing holes.

In some embodiments, the light collecting angle $\theta$ ranges from 11.4 degrees to 24 degrees.

In some embodiments, a thickness of the light-shielding film layer ranges from 20 μm to 100 μm; and/or, an aperture of the at least one of the light-passing holes ranges from 5 μm to 30 μm; and/or, a spacing between two adjacent ones of the light-passing holes ranges from 10 μm to 30 μm.

In some embodiments, at least one of the light-passing holes has a shape of circle, square or hexagon.

In some embodiments, the light-shielding film layer is made of resin photoresist.

In some embodiments, at least one of the light-passing holes is provided with a filler, and the filler is made of a transparent material.

In some embodiments, the filler is made of polyimide or polymethyl methacrylate.

In some embodiments, the plurality of light-passing holes are evenly distributed in the light-shielding film layer.

In some embodiments, wherein at least one of the light-passing holes is provided with a filler, and the filler is made of a transparent material.

In some embodiments, the protective layer and the filler are an integral structure.

Some embodiments of the present disclosure provide a light guide component, comprising a light-shielding film layer made of a black light-shielding material, wherein the light-shielding film layer is provided with a plurality of light-passing holes along a thickness direction of the light-shielding film layer, and the plurality of light-passing holes are arranged in an array, and each of the light-passing holes has a light collecting angle of $\theta$, and the light collecting angle $\theta$ is less than or equal to a maximum light collecting angle $\alpha$ at which valley and ridge of the fingerprint to be identified can be distinguished.

Some embodiments of the present disclosure provide a manufacturing method of a fingerprint identification device, the manufacturing method comprising:

providing a display panel that comprises at least one light-emitting surface and an opposite side disposed opposite to the light-emitting surface, the light-emitting surface being configured to approach valley and ridge of a fingerprint to be identified;

preparing a light guide component and disposing the light guide component on the opposite side of the display panel; and disposing a light sensing component on a side of the light guide component away from the display panel;

wherein the valley and ridge of the fingerprint to be identified are configured to receive and reflect light emitted by the display panel, the light sensing component is configured to receive light reflected by the valley and ridge of the fingerprint to be identified, and a maximum light collecting angle at which the valley and ridge of the fingerprint to be identified can be distinguished by the light sensing component is $\alpha$;

the light guide component comprises a light-shielding film layer, the light-shielding film layer is made of a black light-shielding material, the light-shielding film layer is provided with a plurality of light-passing holes along a thickness direction of the light-shielding film layer, and the plurality of light-passing holes are arranged in an array, and each of the light-passing holes has a light collecting angle of θ, and the light collecting angle θ is less than or equal to the maximum light collecting angle α.

In some embodiments, the step of preparing a light guide component comprises:

forming, by using a black light-shielding material, the light-shielding film layer on a base substrate;

forming the plurality of light-passing holes in the light-shielding film layer along a thickness direction of the light-shielding film layer; and peeling off the base substrate.

In some embodiments, after forming the plurality of light-passing holes in the light-shielding film layer along a thickness of the light-shielding film layer, the step of preparing a light guide component further comprises:

filling the plurality of light-passing holes with a transparent material to form a filler.

In some embodiments, after filling the plurality of light-passing holes with a transparent material to form a filler, the step of preparing a light guide component further comprises:

forming a protective layer, by using a transparent material, on a side of the light-shielding film layer away from the base substrate.

In some embodiments, the protective layer and the filler are an integral structure.

In some embodiments, the light collecting angle θ of at least one of the light-passing holes satisfies the following formula:

$$\mathrm{Tan}(\theta/2) = W/H;$$

wherein, H is a thickness of the light-shielding film layer, and W is an aperture of the at least one of the light-passing holes.

DETAILED DESCRIPTION OF EMBODIMENTS

Figure 1:
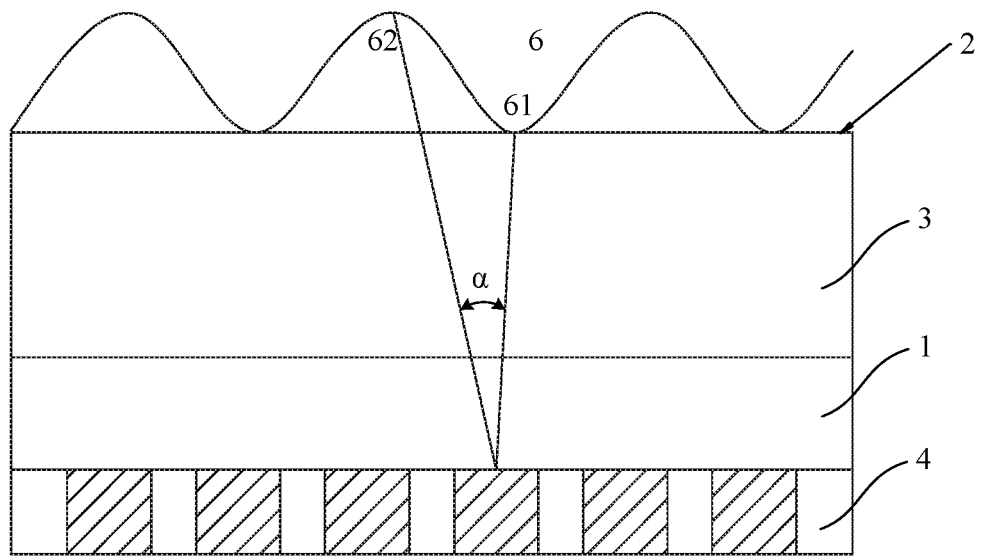
FIG. 1 is a schematic cross-sectional structure diagram of a fingerprint identification device according to an exemplary embodiment of the present disclosure.

Exemplary embodiments will be described in detail here, and examples thereof are shown in the accompanying drawings. When the following description refers to the accompanying drawings, unless otherwise indicated, the same numbers in different drawings indicate the same or similar elements. The implementation manners described in the following exemplary embodiments do not represent all implementation manners consistent with the present disclosure. Rather, they are merely examples of devices consistent with some aspects of the present disclosure as detailed in the appended claims.

The terms used in the present disclosure are only for the purpose of describing specific embodiments, and are not intended to limit the present disclosure. Unless otherwise defined, the technical terms or scientific terms used in the present disclosure shall have the usual meanings understood by those with ordinary skills in the field to which this disclosure belongs. Similar words such as "a" or "one" used in the specification and claims of the present disclosure do not mean a quantity limitation, but mean that there is at least one. Similar words such as "comprise" or "include" mean that the elements or items before "comprise" or "include" now cover the elements or items listed after "comprise" or "include" and their equivalents, and do not exclude other elements or objects. Similar words such as "connect with" or "connect to" are not limited to physical or mechanical connections, and may include electrical connections, whether direct or indirect. "Plurality of" includes two and is equivalent to at least two. The singular forms of "a", "said" and "the" used in this disclosure and the appended claims are also intended to include plural forms, unless the context clearly indicates other meanings. It should also be understood that the term "and/or" used herein refers to and includes any or all possible combinations of one or more associated listed items.

The present disclosure provides a fingerprint identification device comprising a display panel, a light guide component and a light sensing component stacked in sequence. The display panel comprises at least one light-emitting surface and an opposite side disposed opposite to the light-emitting surface, the light-emitting surface being configured to approach valley and ridge of a fingerprint to be identified. The light guide component is disposed on the opposite side of the display panel. The light sensing component is disposed on a side of the light guide component away from the display panel.

The valley and ridge of the fingerprint to be identified are configured to receive and reflect light emitted by the display panel, the light sensing component is configured to receive light reflected by the valley and ridge of the fingerprint to be identified, and a maximum light collecting angle at which the valley and ridge of the fingerprint to be identified can be distinguished by the light sensing component is α.

The light guide component comprises a light-shielding film layer, the light-shielding film layer is made of a black light-shielding material, the light-shielding film layer is provided with a plurality of light-passing holes along a thickness direction of the light-shielding film layer, and the plurality of light-passing holes are arranged in an array, and each of the light-passing holes has a light collecting angle of θ, and the light collecting angle θ is less than or equal to the maximum light collecting angle.

By providing the light-passing holes in the light-shielding film layer of the light guide component and setting the material of the light-shielding film layer to be black light-shielding material, the light reflected by the fingerprint to be identified is filtered through the light-passing holes for fingerprint identification. The light filtered by the light-passing holes can enter the light sensing component through the light-passing holes, and will be sensed by the light sensing component, while the other light will be shielded or absorbed by the black light-shielding material. With this arrangement, after passing through the light-passing holes, each light beam can accurately correspond to the valley or ridge of the fingerprint to be identified, avoiding the influence of other stray light on the light sensing component, and improving the detection accuracy of the light sensing component, thereby improving accuracy of identifying fingerprint information. Compared with the optical fingerprint recognition in related art, the fingerprint identification device of the present disclosure has a simpler processing technology and a lighter and thinner structure, which can solve the problem of light crosstalk and low recognition accuracy caused by the large distance between the finger and the light sensing component of the fingerprint identification device.

FIG. 1 is a schematic cross-sectional structure diagram of a fingerprint identification device according to an exemplary embodiment of the present disclosure. Please referring to FIG. 1 for understanding, some embodiments of the present disclosure provide a fingerprint identification device 2, and the fingerprint identification device 2 includes a display panel 3, a light guide component 1, and a light sensing component 4 stacked in sequence. The display panel 3 is, for example, an OLED display panel, a PLED display panel, etc. The light guide component 1 is disposed on the opposite side of the light emitting side of the display panel 3, and the light sensing component 4 is disposed on the side of the light guide component 1 away from the display panel 3, and the light sensing component 4 is, for example, an array of light sensors.

As shown in FIG. 1, the finger 6 touches the light-emitting surface of the display panel 3, and the fingerprint of the finger 6 includes a ridge 61 and a valley 62. FIG. 1 shows the maximum light collecting angle α at which the ridge 61 and valley 62 of the fingerprint to be identified can be distinguished.

Figure 2:
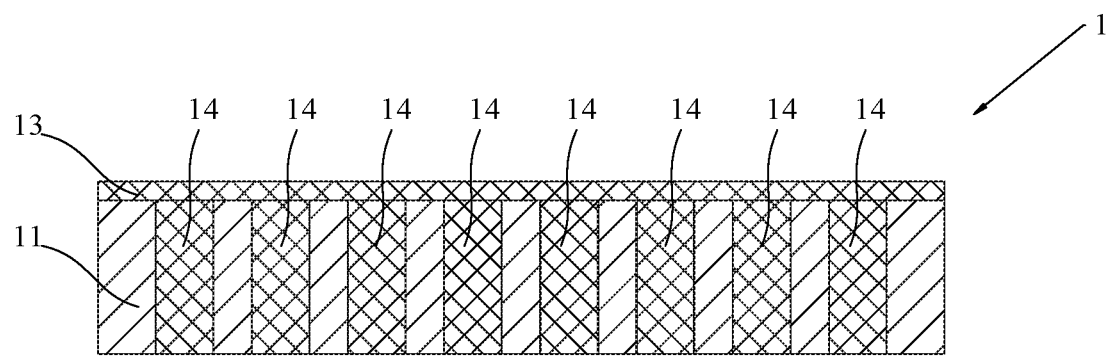
FIG. 2 is a schematic cross-sectional structure diagram of a light guide component according to an exemplary embodiment of the present disclosure.
Figure 3:
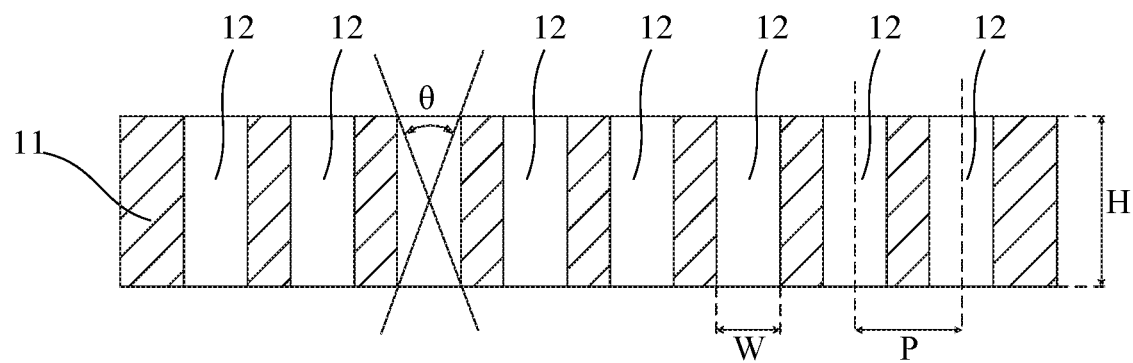
FIG. 3 is a schematic cross-sectional structure diagram of a light-shielding film layer of the light guide component according to an exemplary embodiment of the present disclosure.

FIG. 2 is a schematic cross-sectional structure diagram of a light guide component according to an exemplary embodiment of the present disclosure. FIG. 3 is a schematic cross-sectional structure diagram of a light-shielding film layer of the light guide component according to an exemplary embodiment of the present disclosure. As shown in FIGS. 2 and 3, the light guide component 1 includes a light-shielding film layer 11 and a protective layer 13 that are stacked in sequence. The light-shielding film layer 11 is made of black light-shielding material. The light-shielding film layer 11 is provided with a plurality of light-passing holes 12 along the thickness direction of the light-shielding film layer 11. The plurality of light-passing holes 12 are arranged in an array, and the light-passing hole 12 is formed with light collecting angle θ, The light collecting angle θ0 of the light-passing hole 12 is less than or equal to the maximum light collecting angle α at which the ridge and valley of the fingerprint to be identified can be distinguished.

In some embodiments, the plurality of light-passing holes 12 have the same shape and size, and their light collecting angles θ are also the same. Those skilled in the art will understand that in other embodiments, shape and size of the plurality of light-passing holes 12 can be different, and their light collecting angles θ can also be different.

In some embodiments, the plurality of light-passing holes 12 are evenly distributed in the light-shielding film layer 11.

It should be noted that, as shown in FIG. 1, during fingerprint identification, when the finger 6 touches the display screen, for example, the light-emitting surface of display panel 3, the maximum light collecting angle α at which the ridge and valley of the fingerprint to be identified on finger 6 can be justly distinguish is α. By setting the light collecting angle θ of the light-passing holes 12 to be less than or equal to the maximum light collecting angle α at which the ridge and valley of the fingerprint to be identified can be distinguished, it is possible to filter the light reflected by the fingerprint to be identified, and the filtered light can enter the light sensing component 4 through the light-passing holes 12 and be sensed by the light sensing component 4, so that each beam of the filtered light can accurately correspond to the valley 62 or ridge 61 of the fingerprint to be identified, avoiding the influence of other stray light on the light sensing component 4, and improving the detection accuracy of the light sensing component 4, thereby improving accuracy of identifying fingerprint information.

In some embodiments, the light-shielding film layer 11 is made of resin photoresist. The resin photoresist can be directly patterned by exposure and development processes. For example, provision of the light-passing holes 12 in the light-shielding film layer 11 does not require addition of a layer of photoresist in the patterning process, thereby simplifying the process steps of forming the light-passing holes 12.

In this embodiment, the shape of the light-passing hole 12 is, for example, a circle, but it is not limited thereto. In other embodiments, the shape of the light-passing hole 12 may also be a square or a hexagon.

As shown in FIG. 3, the light collecting angle θ of the light-passing hole 12 satisfies the following formula:

$$\mathrm{Tan}(\theta/2)=W/H;$$

wherein, H is a thickness of the light-shielding film layer 11, and W is an aperture of the light-passing hole 12.

In some embodiments, the light collecting angle θ of the light-passing holes 12 range from 11.4 degrees to 24 degrees. In this way, by setting the angle range of the light collecting angle θ of the light-passing holes 12, the light-shielding film layer 11 can filter out light with a small angle close to collimation, so that each beam of the filtered light can accurately correspond to the valley or ridge of the fingerprint to be identified, avoiding the influence of other stray light on the light sensing component 4, and improving the detection accuracy of the light sensing component 4, thereby improving accuracy of identifying fingerprint information.

In some embodiments, a thickness H of the light-shielding film layer ranges from 20 μm to 100 μm. In this way, by controlling the thickness H of the light-shielding film layer 11 to control the overall thickness of the light guide component 1, the structure of the light guide component 1 is made lighter and thinner.

Correspondingly, an aperture W of the light-passing hole 12 ranges from 5 μm to 30 θm, so as to meet the range requirement of the light collecting angle θ of the light-passing holes 12.

In some embodiments, a spacing P between two adjacent light-passing holes 12 ranges from 10 μm to 30 μm. The spacing P between two adjacent light-passing holes 12 refers to the distance between the central axes of the two adjacent light-passing holes 12.

In some embodiments, when the light collecting angle θ of the light-passing holes 12 is 11.4 degrees, an appropriate aperture size of the light-passing holes 12 is selected according to the above relationship and process conditions, for example, if the aperture W of the light-passing holes 12 is selected to be 6 μm, the thickness H of the light-shielding film layer is 60 μm.

Figure 4:
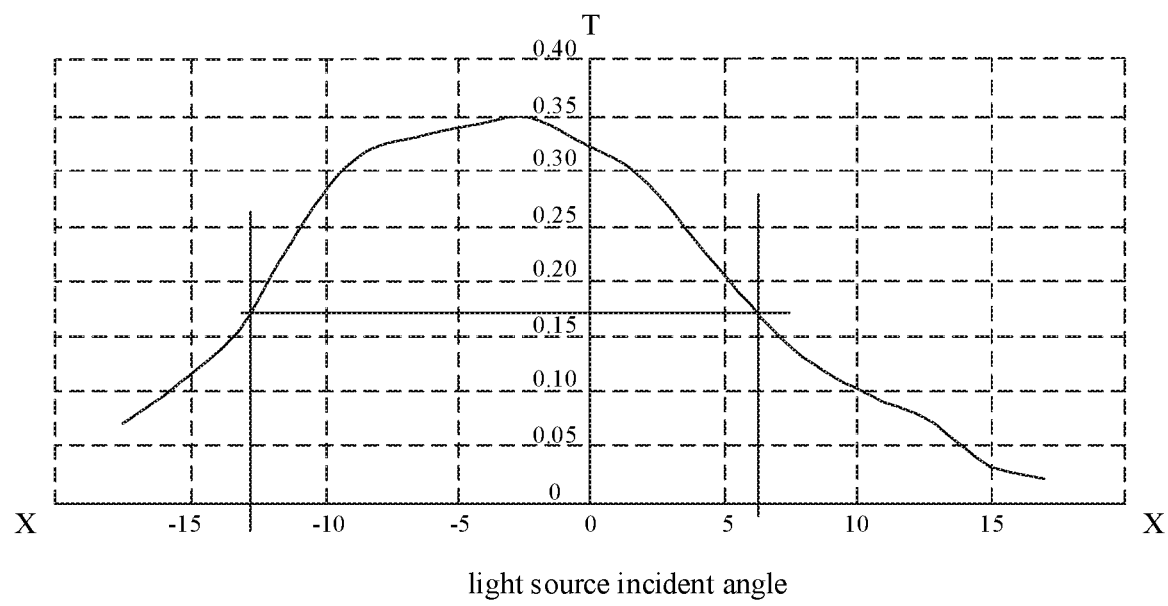
FIG. 4 is a graph of the transmittance test of the light-shielding film layer of the light guide component according to an exemplary embodiment of the present disclosure.

FIG. 4 is a graph of the transmittance test of the light-shielding film layer of the light guide component according to an exemplary embodiment of the present disclosure. As shown in FIG. 4, FIG. 4 is a graph obtained by measuring the transmittance of the light guide component by an instrument at different incident angles of the light source, where the X axis is the incident angle of the light source, and the incident angle of the light source is defined as an included angle between the incident direction of the light source and the axis of the light-passing hole 12. When the light source is incident parallel to the axis of the light-passing holes, the included angle is 0 degree. When the incident direction of the light source is deflected clockwise relative to the axis of the light-passing hole 12, the included angle is positive. When the incident direction of the light source is deflected counterclockwise relative to the axis of the light-passing hole 12, the included angle is negative. The T axis is the transmittance. Half of the transmittance peak is taken as the half-peak value. The distance between the X-axis values corresponding to the two half-peak values on the curve can be regarded as the light collecting angle of the light-passing hole obtained by the measurement. As shown in FIG. 4, the values on the X axis corresponding to the two half-peak values are −13 degrees and 6 degrees, and the light collecting angle θ of the light-passing hole 12 obtained from this measurement is 19 degrees, which falls the range of 11.4 degrees to 24 degrees. As shown in FIG. 4, the central transmittance is 35%. When the incident angle of the light source is between −13 degrees and 6 degrees, the transmittance is approximately greater than or equal to 18%. In this case, the effect of identifying and distinguishing the valley and ridge of the fingerprint can be achieved, while avoiding the influence of other stray light on the light sensing component 4.

As shown in FIG. 2, the light guide component 1 further comprises a protective layer 13 disposed on a side of the light-shielding film layer 11, and the protective layer 13 is made of a transparent material. By providing the protective layer 13, the light-shielding film layer 11 can be protected. The material of the protective layer 13 is polyimide (PI) or polymethyl methacrylate (PMMA). The thickness of the protective layer 13 is less than 1 μm.

In some embodiments, a filler 14 is provided in the light-passing hole 12, and the filler 14 is made of a transparent material. The material of the filler 14 is polyimide (PI) or polymethyl methacrylate (PMMA). The filler 14 can support the light-passing hole, thereby enhancing the overall strength of the light-shielding film layer 11. In some embodiments, the filler 14 and the protective layer 13 are made of the same material and are integrally formed. However, it is not limited to this. In other embodiments, the filler 14 and the protective layer 13 may also be formed separately; the filler 14 and the protective layer 13 may also be made of different materials.

Please refer to FIG. 1 again, in some embodiments of the present disclosure, the fingerprint identification device 2 includes the display panel 3, the light guide component 1 as described above and the light sensing component 4 that are stacked. The display panel 3 is, for example, an OLED display panel, a PLED display panel, etc. The light guide component 1 is disposed on the opposite side of the light emitting side of the display panel 3, and the light sensing component 4 is disposed on the side of the light guide component 1 away from the display panel 3, and the light sensing component 4 is, for example, an array of light sensors. The light guide component 1 is used to filter the light to enter the light sensing component 4, the light is emitted from the display panel 3 to the fingerprint to be identified and reflected back by the fingerprint to be identified. The light sensing component 4 is used for detecting and the intensity of the filtered light. That is, the light emitted by the display panel 3 is reflected back by the fingerprint to be identified, filtered by the light guide component 1, and then enters the light sensing component 4.

In some embodiments, the display panel 3 may be an OLED display panel, that is, from top to bottom, it includes a cover plate, a photosensitive adhesive, a polarizer, a thin film packaging structure, a light emitting component, a thin film diode, and a back plate. But not limited to this, the display panel 3 may also be an LED display panel or other display panels.

The fingerprint identification working principle of the fingerprint identification device 2 in the present disclosure is as follows.

During fingerprint identification, when a finger touches the display screen, the light-shielding film layer in the light-guiding component can filter out the light beams at a small angle substantially perpendicular to the light-guiding component, and make them reach the light sensing component under the light guide component through the light-guiding holes, avoiding the influence of other stray light on the light sensing component. The light sensing component can detect the intensity of the light. The energies of the light reflected downward by the valley and ridge of the fingerprint to be identified of the finger are different, and the light intensities detected by the sensing component are different, thereby obtaining fingerprint information. At the same time, since the light passing through the light shielding layer is the light that has been filtered, each beam of light that is filtered out can accurately correspond to the valley or ridge of the fingerprint to be identified. No other stray light will affect the light sensing component, thereby improving the detection accuracy of the light sensing component and further improving the accuracy of identifying fingerprint information.

Based on the same inventive concept, some embodiments of the present disclosure provide a manufacturing method of the aforementioned fingerprint identification device. The method includes the following steps of:

providing a display panel that comprises at least one light-emitting surface and an opposite side disposed opposite to the light-emitting surface, the light-emitting surface being configured to approach valley and ridge of a fingerprint to be identified;

preparing a light guide component and disposing the light guide component on the opposite side of the display panel; and disposing a light sensing component on a side of the light guide component away from the display panel.

The valley and ridge of the fingerprint to be identified are configured to receive and reflect light emitted by the display panel, the light sensing component is configured to receive light reflected by the valley and ridge of the fingerprint to be identified, and a maximum light collecting angle at which the valley and ridge of the fingerprint to be identified can be distinguished by the light sensing component is α.

Figure 5:
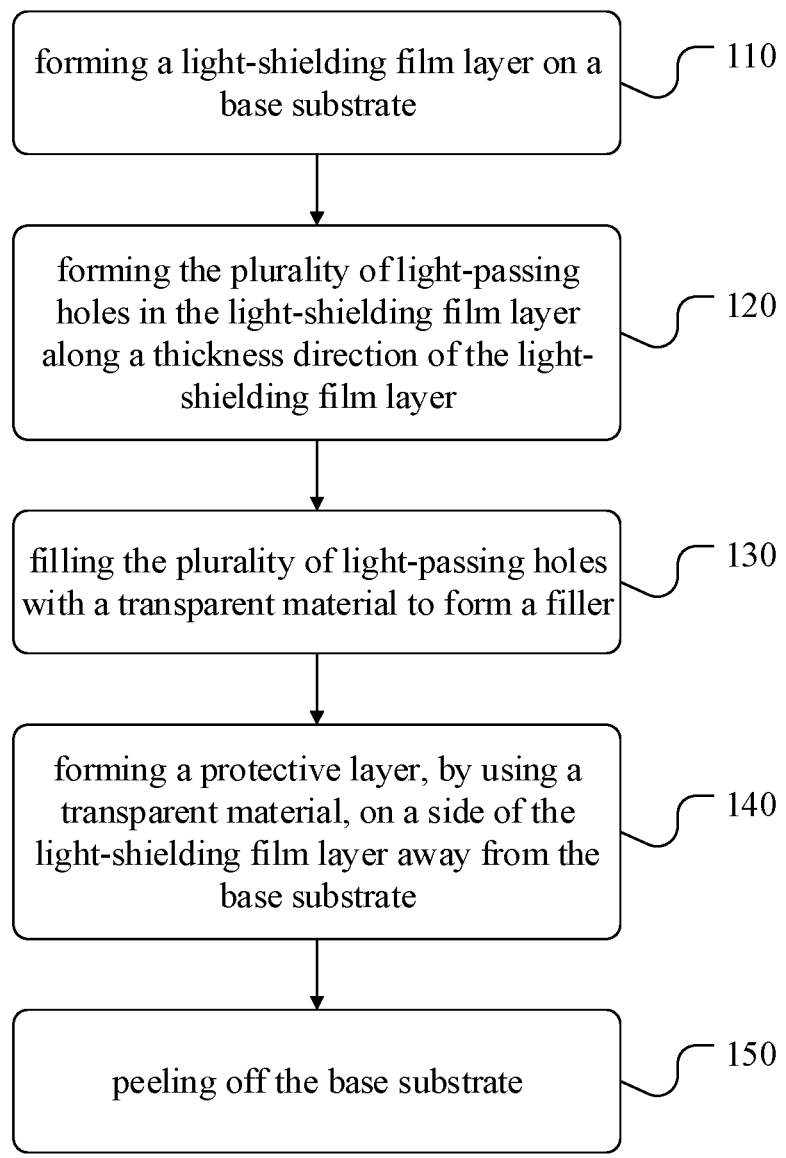
FIG. 5 is a flowchart of a manufacturing method of the light guide component according to an exemplary embodiment of the present disclosure.

The light guide component comprises a light-shielding film layer, the light-shielding film layer is made of a black light-shielding material, the light-shielding film layer is provided with a plurality of light-passing holes along a thickness direction of the light-shielding film layer, and the plurality of light-passing holes are arranged in an array, and each of the light-passing holes has a light collecting angle of θ, and the light collecting angle θ is less than or equal to the maximum light collecting angle α. The following specifically introduces the manufacturing method of the light guide component in the fingerprint identification device. FIG. 5 is a flowchart of a manufacturing method of the light guide component according to an exemplary embodiment of the present disclosure. FIGS. 6(a) to 6(e) are schematic diagrams of the structure of the light guide component in each step in the process of the manufacturing method of the light guide component according to an exemplary embodiment of the present disclosure. Referring to FIG. 5, the manufacturing method includes:

step 110, forming a light-shielding film layer on a base substrate;

step 120, forming the plurality of light-passing holes in the light-shielding film layer along a thickness direction of the light-shielding film layer;

step 130, filling the plurality of light-passing holes with a transparent material to form a filler;

step 140, forming a protective layer, by using a transparent material, on a side of the light-shielding film layer away from the base substrate; and step 150, peeling off the base substrate.

Figure 6A:
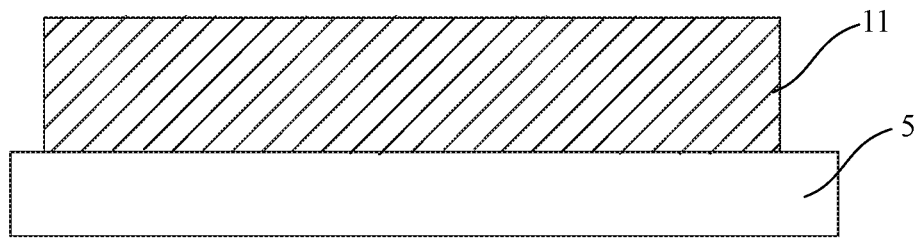
FIGS. 6(a) to 6(e) are schematic diagrams of the structure of the light guide component in each step in the process of the manufacturing method of the light guide component according to an exemplary embodiment of the present disclosure.

In step 110, as shown in FIG. 6(a), the light-shielding film layer 11 is formed on the base substrate 5 by using a black light-shielding material. The black light-shielding material is, for example, resin photoresist. The light-shielding film layer 11 can be formed by processes such as coating and inkjet.

Figure 6B:
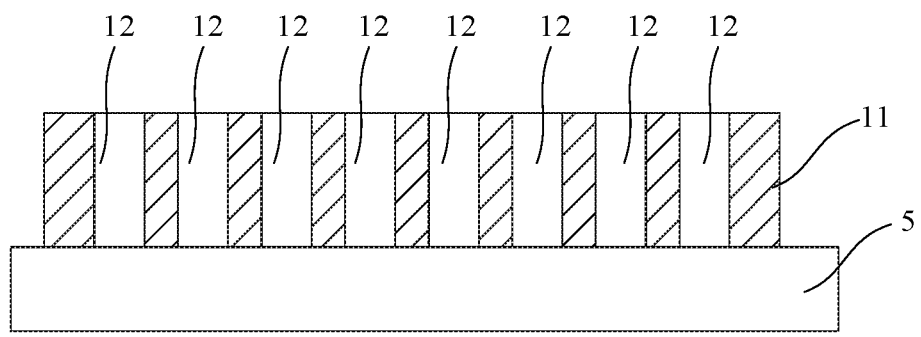
Figure 6C:
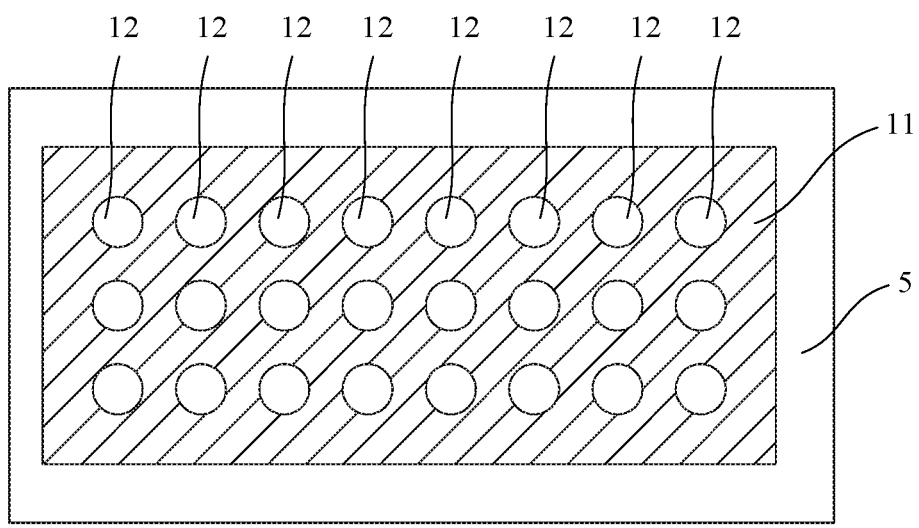

In step 120, as shown in FIG. 6(b), the plurality of light-passing holes 12 are formed in the light-shielding film layer 11 by using a patterning process. The plurality of light-passing holes 12 is formed in the light-shielding film layer 11 along the thickness direction of the light-shielding film layer 11 and penetrates the light-shielding film layer 11, and the plurality of light-passing holes 12 are arranged in an array. The material of the light-shielding film layer 11 is black light-shielding material. In this way, by providing the light-passing holes 12 in the light-shielding film layer 11 formed by the black light-shielding material of the light guide component 1, the light-passing holes 12 can be used to filter the light reflected by the fingerprint to be identified and the filtered light can enter the light sensing component 4, so that each beam of the filtered light can accurately correspond to the valley or ridge of the fingerprint to be identified, avoiding the influence of other stray light on the light sensing component 4, and improving the accuracy of the detection performance of the light sensing component 4, thereby improving the accuracy of identifying fingerprint information. FIG. 6(c) shows a schematic view of the structure of the light-shielding film layer 11 with the light-passing holes 12 formed on the base substrate 5 from another view (a top view).

In some embodiments, the material of the base substrate 5 is polyethylene terephthalate (PET) or polymethyl methacrylate (PMMA).

Regarding the related settings of the light-shielding film layer 11 and the light-passing holes 12, please refer to the forgoing description, and it will not be repeated here.

In step 130, the filler 14 includes the transparent material, and the transparent material is filled into the light-passing holes 12 of the light-shielding film layer 11 by using a process such as coating to form the filler 14. The material of the filler 14 is, for example, polyimide (PI) or polymethyl methacrylate (PMMA).

In step 140, the protective layer 13 is formed on the side of the light-shielding film layer 11 away from the base substrate 5. The material of the protective layer 13 is a transparent material and can be formed by a coating process. In other embodiments, the step of forming the protective layer 13 on the light-shielding film layer 11 may not be included.

Figure 6D:
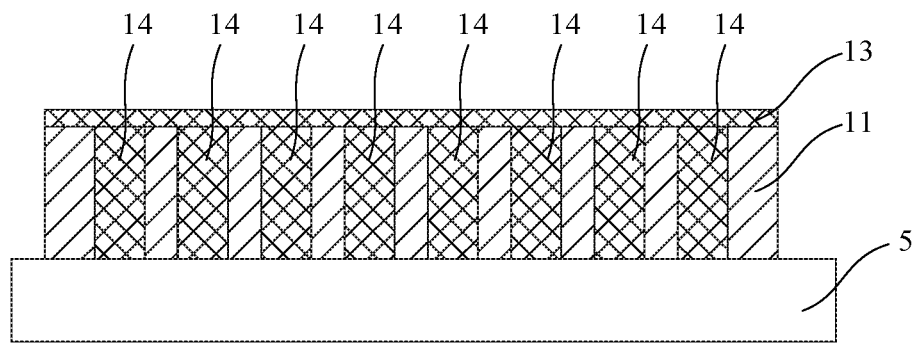

In some embodiments, the filler 14 in the light-passing holes 12 and the protective layer 13 can be integrally formed by the same process, as shown in FIG. 6(d), the light-shielding film layer is formed by coating a transparent material on the light-shielding film layer 11 through injection molding or other hot-melt processes, to form the transparent material layer, and at the same time the transparent material is pressurized so that the transparent material enters the light-passing holes 12 of the light-shielding film layer 11, and the filler 14 in the light-passing holes 12 and the protective layer 13 on the shielding film layer 11 are formed at the same time. The filler 14 can support the light-passing holes, thereby enhancing the overall strength of the light-shielding film layer 11. The protective layer 13 and the filler 14 are integrally formed, and both are made of polyimide (PI) or polymethyl methacrylate (PMMA). In other embodiments, the filler 14 may be formed first, and then the protective layer 13 may be formed. The filler 14 and the protective layer 13 may also be made of different materials.

Figure 6E:
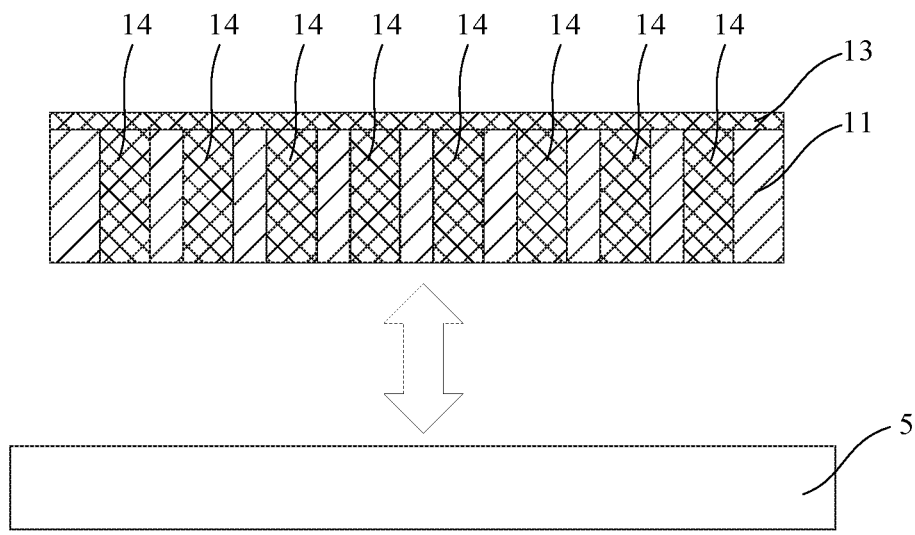

In step 150, as shown in FIG. 6(e), the base substrate 5 is separated from the light-shielding film layer 11, thereby forming the final light guide component 1.

Compared with the related art, the manufacturing method of the fingerprint identification device, including the light guide component, of the present disclosure has simpler processing technology, which makes the light guide component lighter and thinner, and can solve the problem of light crosstalk and low recognition accuracy caused by the large distance between the finger and the light sensing component of the fingerprint identification device.

The above are only the exemplary embodiments of the present disclosure and are not intended to limit the present disclosure. Any modification, equivalent replacement, improvement, etc. made within the spirit and principle of the present disclosure shall be included within the protective scope of the present disclosure.

What is claimed is:

1. A fingerprint identification device, comprising:
a display panel comprising at least one light-emitting surface and an opposite side disposed opposite to the light-emitting surface, the light-emitting surface being configured to approach valley and ridge of a fingerprint to be identified;
a light guide component disposed on the opposite side of the display panel; and
a light sensing component disposed on a side of the light guide component away from the display panel, wherein
the valley and ridge of the fingerprint to be identified are configured to receive and reflect light emitted by the display panel, the light sensing component is configured to receive light reflected by the valley and ridge of the fingerprint to be identified, and a maximum light collecting angle at which the valley and ridge of the fingerprint to be identified can be distinguished by the light sensing component is α;
the light guide component comprises a light-shielding film layer, the light-shielding film layer is made of a black light-shielding material, the light-shielding film layer is provided with a plurality of light-passing holes along a thickness direction of the light-shielding film layer, and the plurality of light-passing holes are arranged in an array, and each of the light-passing holes has a light collecting angle of θ, and the light collecting angle θ is less than or equal to the maximum light collecting angle α.

2. The fingerprint identification device according to claim 1, wherein the light guide component further comprises a protective layer disposed on a side of the light-shielding film layer close to the display panel, and the protective layer is made of a transparent material.

3. The fingerprint identification device according to claim 2, wherein the protective layer is made of polyimide or polymethyl methacrylate.

4. The fingerprint identification device according to claim 1, wherein the light collecting angle θ of at least one of the light-passing holes satisfies the following formula:

$$Tan(\theta/2)=W/H;$$

wherein, H is a thickness of the light-shielding film layer, and W is an aperture of the at least one of the light-passing holes.

5. The fingerprint identification device according to claim 4, wherein the light collecting angle θ ranges from 11.4 degrees to 24 degrees.

6. The fingerprint identification device according to claim 1, wherein
a thickness of the light-shielding film layer ranges from 20 μm to 100 μm; and/or,
an aperture of the at least one of the light-passing holes ranges from 5 μm to 30 μm; and/or,
a spacing between two adjacent ones of the light-passing holes ranges from 10 μm to 30 μm.

7. The fingerprint identification device according to claim 1, wherein at least one of the light-passing holes has a shape of circle, square or hexagon.

8. The fingerprint identification device according to claim 1, wherein the light-shielding film layer is made of resin photoresist.

9. The fingerprint identification device according to claim 1, wherein at least one of the light-passing holes is provided with a filler, and the filler is made of a transparent material.

10. The fingerprint identification device according to claim 9, wherein the filler is made of polyimide or polymethyl methacrylate.

11. The fingerprint identification device according to claim 1, wherein the plurality of light-passing holes are evenly distributed in the light-shielding film layer.

12. The fingerprint identification device according to claim 2, wherein at least one of the light-passing holes is provided with a filler, and the filler is made of a transparent material.

13. The fingerprint identification device according to claim 12, wherein the protective layer and the filler are an integral structure.

14. A manufacturing method of a fingerprint identification device, the manufacturing method comprising:
providing a display panel that comprises at least one light-emitting surface and an opposite side disposed opposite to the light-emitting surface, the light-emitting surface being configured to approach valley and ridge of a fingerprint to be identified;

preparing a light guide component and disposing the light guide component on the opposite side of the display panel; and
disposing a light sensing component on a side of the light guide component away from the display panel;
wherein the valley and ridge of the fingerprint to be identified are configured to receive and reflect light emitted by the display panel, the light sensing component is configured to receive light reflected by the valley and ridge of the fingerprint to be identified, and a maximum light collecting angle at which the valley and ridge of the fingerprint to be identified can be distinguished by the light sensing component is α;
the light guide component comprises a light-shielding film layer, the light-shielding film layer is made of a black light-shielding material, the light-shielding film layer is provided with a plurality of light-passing holes along a thickness direction of the light-shielding film layer, and the plurality of light-passing holes are arranged in an array, and each of the light-passing holes has a light collecting angle of θ, and the light collecting angle θ is less than or equal to the maximum light collecting angle α.

15. The manufacturing method according to claim 14, wherein, the step of preparing a light guide component comprises:
forming, by using a black light-shielding material, the light-shielding film layer on a base substrate;
forming the plurality of light-passing holes in the light-shielding film layer along a thickness direction of the light-shielding film layer; and
peeling off the base substrate.

16. The manufacturing method according to claim 15, wherein after forming the plurality of light-passing holes in the light-shielding film layer along a thickness of the light-shielding film layer, the step of preparing a light guide component further comprises:
filling the plurality of light-passing holes with a transparent material to form a filler.

17. The manufacturing method according to claim 16, wherein, after filling the plurality of light-passing holes with a transparent material to form a filler, the step of preparing a light guide component further comprises:
forming a protective layer, by using a transparent material, on a side of the light-shielding film layer away from the base substrate.

18. The manufacturing method according to claim 16, wherein the protective layer and the filler are an integral structure.

19. The manufacturing method according to claim 14, wherein the light collecting angle θ of at least one of the light-passing holes satisfies the following formula:

$$Tan(\theta/2)=W/H;$$

wherein, H is a thickness of the light-shielding film layer, and W is an aperture of the at least one of the light-passing holes.

* * * * *